United States Patent
Brady (10) Patent No.: US 8,407,338 B2
(45) Date of Patent: Mar. 26, 2013

(54) METHODS AND SYSTEMS FOR POLLING AN ON DEMAND SERVICE

(75) Inventor: David Brady, Oakland, CA (US)

(73) Assignee: salesforce.com, San Francisco, CA (US)

(*) Notice: Subject to any disclaimer, the term of this patent is extended or adjusted under 35 U.S.C. 154(b) by 863 days.

(21) Appl. No.: 12/559,157

(22) Filed: Sep. 14, 2009

(65) Prior Publication Data

US 2010/0205243 A1 Aug. 12, 2010

Related U.S. Application Data

(60) Provisional application No. 61/096,617, filed on Sep. 12, 2008.

(51) Int. Cl.
*G06F 15/16* (2006.01)

(52) U.S. Cl. .......................... 709/224; 709/203; 709/217

(58) Field of Classification Search .................. 709/224, 709/217, 202, 203
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |

(Continued)

*Primary Examiner* — David Lazaro (74) *Attorney, Agent, or Firm* — Ingrassia Fisher & Lorenz, P.C.

(57) ABSTRACT

Systems and methods for automatically polling for data changes in an on-demand database service environment. A polling server communicates with application servers and client systems. Application servers send update messages to the polling server identifying which database objects have been updated, and client systems communicate with the polling server on a regular basis, rather than with the application server, to determine whether updates to a data object may have been made. When it has been determined that an update may have been made, the client system then sends a refresh request to the application server to request an update to the data object, thereby controlling (e.g., reducing) the number of refresh requests sent to the application server.

20 Claims, 3 Drawing Sheets

U.S. PATENT DOCUMENTS

| | | | |
|---|---|---|---|
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,340,411 | B2 | 3/2008 | Cook |
| 7,620,655 | B2 | 11/2009 | Larsson et al. |
| 7,698,160 | B2 | 4/2010 | Beaven et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0100035 | A1* | 7/2002 | Kenyon et al. ............... 717/168 |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0188046 | A1* | 8/2005 | Hickman et al. ............... 709/206 |
| 2008/0168139 | A1* | 7/2008 | Junuzovic et al. ............ 709/205 |

* cited by examiner

METHODS AND SYSTEMS FOR POLLING AN ON DEMAND SERVICE

CROSS-REFERENCES TO RELATED APPLICATIONS

This application claims the benefit of U.S. Provisional Application Ser. No. 61/096,617, filed Sep. 12, 2008, the disclosure of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to refreshing displayed data, and more particularly to refreshing data displayed on a page after the data has been changed in the underlying database.

There is an expectation that changes made to a user's data show up in a reasonable amount of time in a displayed web page or other displayed data object. The source of the change may influence what "reasonable" means. For changes made through local activity on their workstation, reasonable may be a few seconds. For changes made through non-local activity, reasonable may be a few seconds or a few minutes. Local activity might include a user changing their own object data on their own client system, e.g., through web pages displayed on the client system, or through newer UI methods such as drag and drop techniques. Non-local activity might include User B changing User A's data using a different client system, or User A's events changing through automated processes such as through workflow processes and/or triggers, or User A's events changing via an API.

If local activity indicates that data for a displayed object has changed, a process is used to cause the object or page to refresh itself. This allows nearly immediate reflection of changes when a user changes their data through local activity, but does not address any of the user change sources.

Current solutions include a data page refreshing itself periodically, e.g., every 15 minutes, by way of sending update requests to the application server. Any change to the data page, either local or non-local, will be reflected in 15 minute intervals. However, there are numerous issues with this approach. For example the page refresh, even at the 15 minute intervals, is expensive and can be difficult to sustain as the number of users scales up (and hence the number of refresh requests hitting the application server). Also, the local activity process is fragile, and only supports one of the potential sources of data changes. Further, a 15 minute interval for refreshes may be too coarse for active use.

One seemingly obvious solution might be to decreases the period in which refresh requests are sent from client systems to the application servers, from 15 minutes to say every minute, or every 30 seconds, etc. However, such a solution becomes untenable as the number of database users, and hence number of refresh requests, increases. The impact on the application servers would inevitably slow down the entire system.

Accordingly, it is desirable to provide systems and methods that overcome the above and other problems.

SUMMARY

Systems and methods are provided for automatically polling for data changes in an on-demand database service environment.

A polling server is provided that communicates with application servers and client systems. Application servers send update messages to the polling server identifying which database objects have been updated, and client systems communicate with the polling server on a regular basis, rather than with the application server, to determine whether updates to a data object may have been made. When it has been determined that an update may have been made, the client system then sends a refresh request to the application server to request an update to the data object, thereby controlling (e.g., reducing) the number of refresh requests sent to the application server. For example, in one embodiment, client systems send request messages to the polling server identifying objects. The polling server determines whether any relevant information about the identified object has been received in update messages from the application servers, and the polling server sends back a response to the requesting client system. Where relevant information is stored at the polling server, the response may include an indication that an update has been made to an identified object, or the response may include information that is usable by the client system to make such a determination. Such information might include a timestamp stored at the polling server, which was included in an update message sent from the application server to the polling server.

According to one embodiment, a method is provided for controlling a number of object update requests sent from a client system to an application server. The method typically includes receiving a request in a polling server from a client system, the request including data identifying a first user, e.g., user id information, and an object provided to the client system by an application server. The method also typically includes determining in the polling server whether an update message related to the object has been received by the polling server from the application server, and if so sending a response from the polling server to the client system, the response including information usable by the client system to determine if new or updated information related to the object is available on the application server. In certain aspects, the outbound message is related to a change event for the object, however, in other aspects, the outbound message is not tied to a specific object or type of object being changed, e.g., the event change message can signify any abstract idea; it can be anything that can trigger workflow or outbound messages.

According to another embodiment, a database system is provided that is configured to control a number of object update requests sent from client systems to an application server. The system typically includes an application server communicably coupled with a database that stores data objects, the application server being configured to provide data objects to client systems and to update data objects responsive to requests from client systems and a polling server communicably coupled with the application server, the polling server configured to receive polling requests from client systems and to receive update messages from the application server. The system also typically includes a client system executing code that causes the client system to periodically send polling requests to the polling server. In a typical operation, upon updating an object, the application server sends an update message to the polling server identifying the object updated, and upon receiving a request from the client system identifying a specific object, the polling server sends a response to the client system including an indication of whether the specific object has been updated, and upon receipt of the response, the client system sends an update request message to the application server requesting updated data for the specific object.

According to yet another embodiment, a tangible computer readable medium is provided that stores code for controlling one or more processors to enable controlling a number of object update requests sent from a client system to an application server. The code typically includes instructions to receive a request in a polling server from a client system, the request including data identifying a first user and an object provided to the client system by an application server, to determine in the polling server whether an update message related to the object has been received by the polling server from the application server, and if so to send a response from the polling server to the client system, the response including information usable by the client system to determine if new or updated information related to the object is available on the application server.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

The present invention provides systems and methods for automatically polling for data changes in an on-demand database service environment.

General Overview

Systems and methods are provided for querying for application server changes without incurring the overhead of direct application server calls.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for providing automatic polling in an on-demand service will be described with reference to example embodiments.

System Overview

Figure 1:
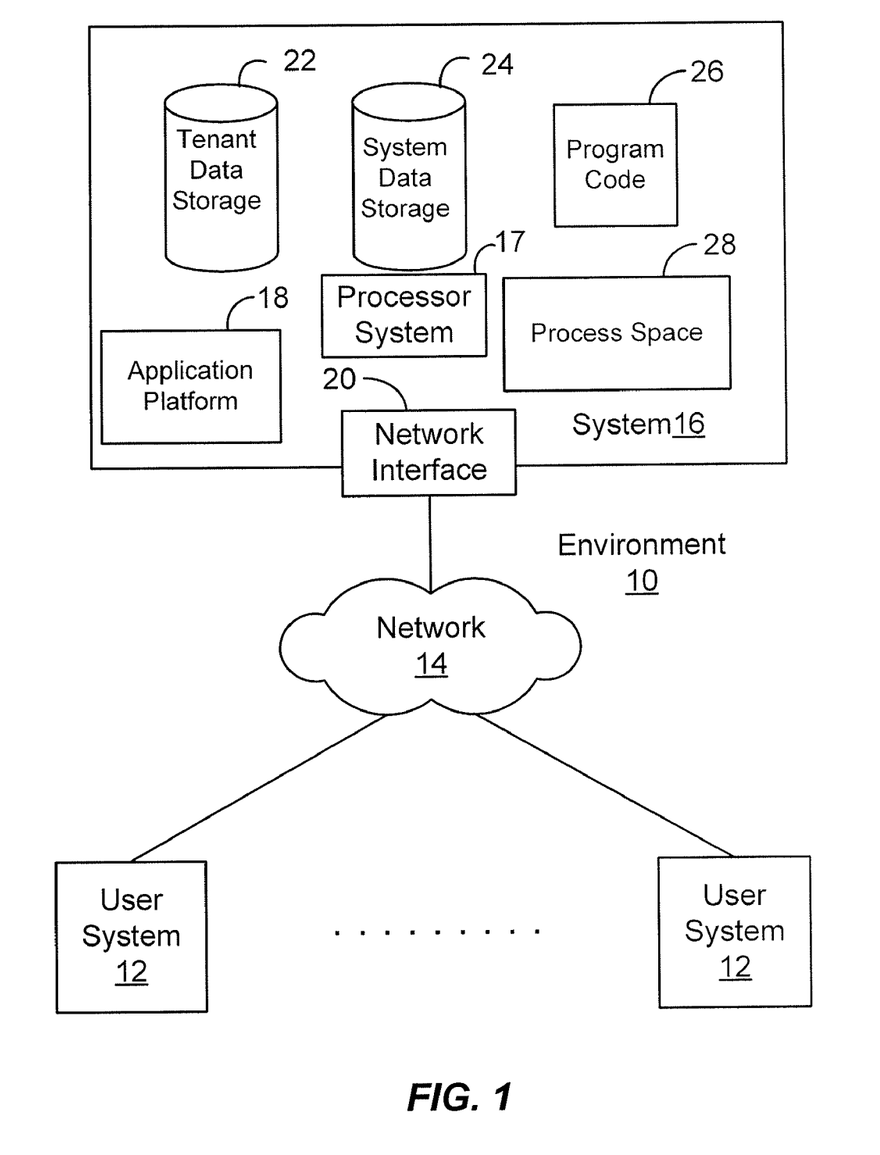
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server faun located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
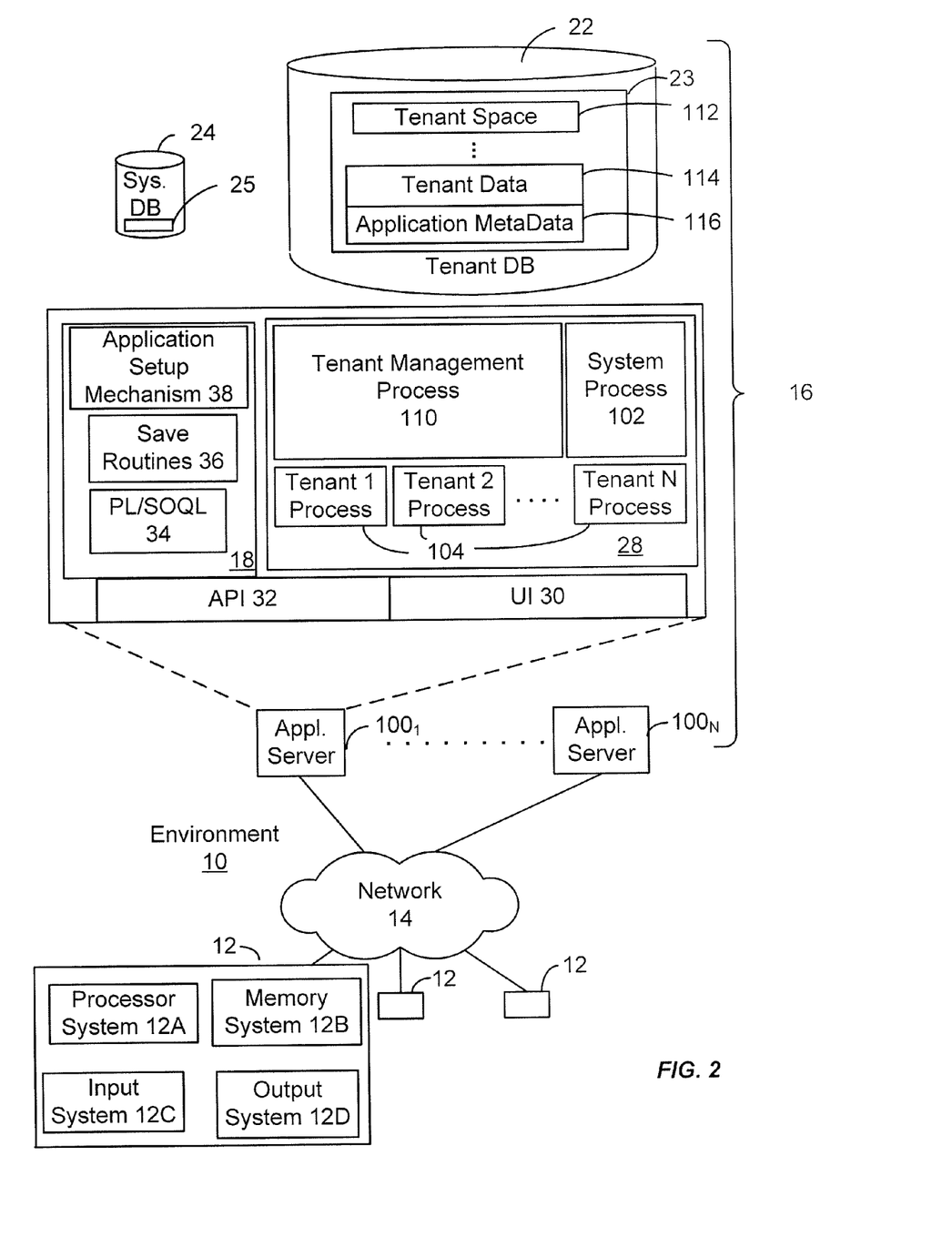
FIG. 2 illustrates a block diagram of an embodiment of elements of FIG. 1 and various possible interconnections between these elements.

FIG. 2 illustrates a block diagram of an embodiment of elements and various possible interconnections between these elements. In the embodiment illustrated by FIG. 2, one or more middle tier servers exist between system 16 and user systems 12. Middle tier servers are termed middle tier because these servers are interposed between the system 16 and the user systems of a particular organization. As described above, network 14 may be used for communication between system 16 and system 12. In one embodiment, the same network 14 is used between a middle tier servers and user systems 12. In another embodiment, a different network is used between a middle tier server and user systems 12. For example, a tenant network [[155N]] may be a wireless network, and network 14 may provide communicable coupling via fiber-optics. Each network 14 or tenant network may also be a combination of different types and protocols.

In one embodiment, each middle tier server manages data of a different organization or tenant, however other embodiments may include information of more than one tenant coupled to a single middle tier server. In another embodiment, each middle tier server may contain a plurality of servers, which collectively provide communication between system 16 and user systems 12 of an organization. The tenant network of each organization may be of a different type (e.g. wireless, optical, . . . ) or protocol. Examples of wireless protocols include Wireless LAN, Global System for Mobile Communications (GSM), Personal Communications Service (PCS), D-AMPS, Wi-Fi, General Packet Radio Service (GPRS), 3G wireless systems such as those using Code division multiple access (CDMA), HIgh PErformance Radio LAN (HIPERLAN), and Worldwide Interoperability for Microwave Access (WiMAX). Full paragraphs must be copied, with strikeout and underscoring to show changes. No need to provide a clean version.

Additionally, FIG. 2 further illustrates elements of system 16 and various interconnections. FIG. 2 shows that user system 12 may include processor system 12A, memory system 12B, input system 12C, and output system 12D. As shown in FIG. 2, network 14 couples user systems 12 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, event/task data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) and/or middle tier servers communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will describe polling in accordance with aspects and embodiments of the present invention.

Polling Overview

It is desirable that a page that displays data (e.g., task/event data in a task/event page such as a calendar) on a client system automatically refresh within a reasonable amount of time after data for that user has changed. In certain aspects, change means that relevant data, e.g., an event or task, was created, modified, or deleted. Changes can be made locally, e.g., the user uses a UI on a client system (such as a workstation, laptop, etc.) to change data for an object, or non-locally, e.g., data changes are made other than on the client system or by the user. Local activity might include a user changing their own object data on a client system, e.g., through web pages displayed on the client system, or through newer UI methods such as drag and drop techniques. Non-local activity might include User B changing User A's data using a different client system, or User A's events changing through automated processes such as through workflow processes and/or triggers, or User A's events changing via an API.

In current systems, a task/event page refreshes itself periodically, e.g., every 15 minutes, so any change to task/events—either local or non-local—will be reflected in 15 minute intervals. This also may be the sole means of displaying non-local changes. However, there is an expectation that changes made to a user's data show up in a reasonable amount of time in the displayed web page or object. The source of the change influences what "reasonable" means. For changes made through local activity on their workstation, reasonable may be a few seconds. For non-local change sources, reasonable may be a few seconds or a few minutes.

If local activity indicates that an event/task has changed, a process is used to cause the task/event page to refresh itself. This allows nearly immediate reflection of changes when a user changes their own task/events through normal pages, but does not address any of the user change sources.

However, there are numerous issues with this approach. For example, the page refresh, even at the 15 minute intervals, is extremely expensive and will not scale well as the number of users increases, the local activity process is fragile, and only supports one of the potential sources of task/event changes, and A 15 minute interval for refreshes is too coarse for active use.

Polling Service Detailed Description

Figure 3:
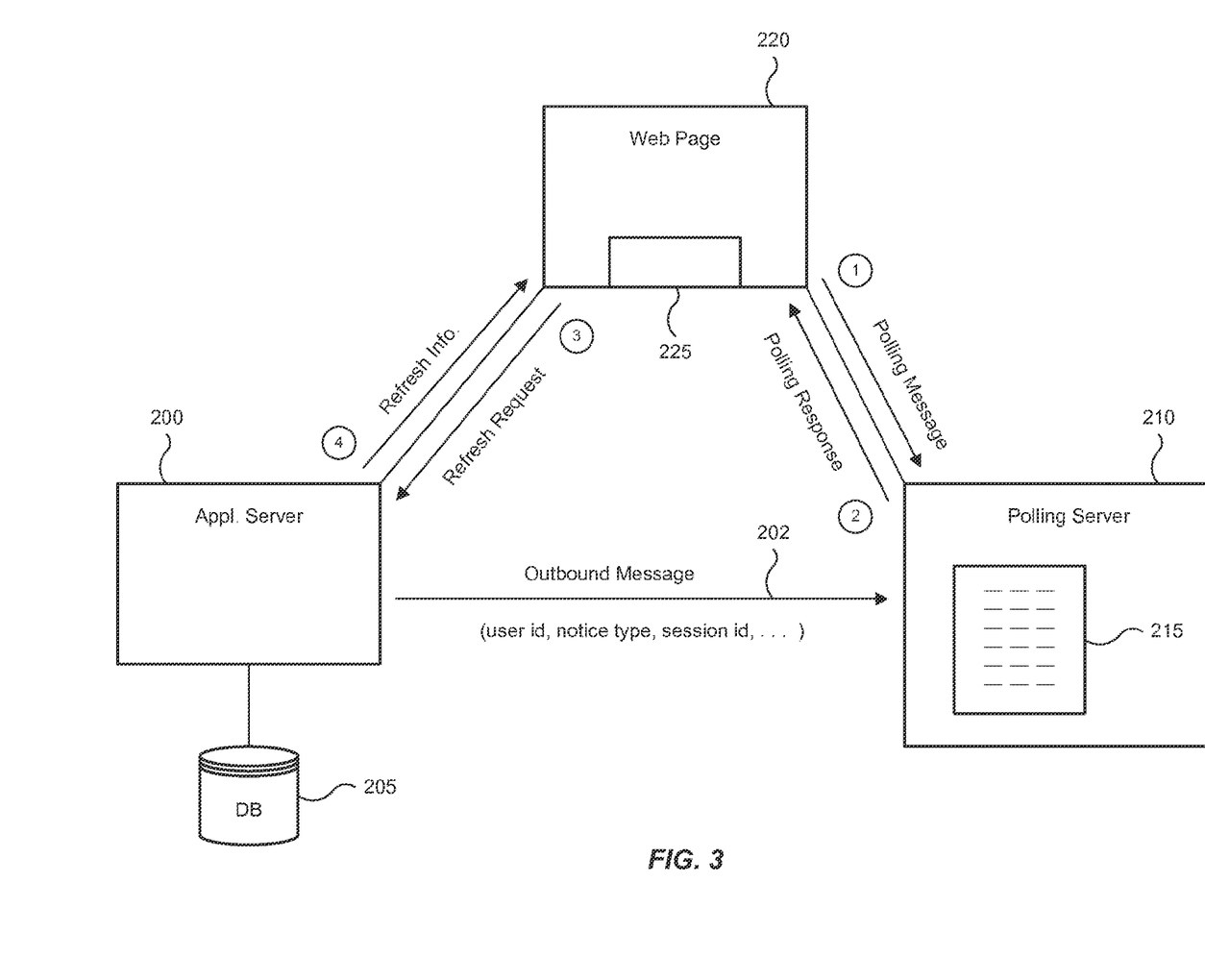
FIG. 3 illustrates an example of a polling system according to one embodiment.

FIG. 3 illustrates an example of a polling system according to one embodiment. Application server 200 provides access to pages and other objects stored in database 205 for clients or subscribers. A polling server 210 communicates with the client systems (pages 220) and application server 200 over a network connection, e.g., over the internet or other network, to provide refresh information and reduce the load on the application server 200 as will be described below. A client system loads a page 220 or other object from database 205 via an application server 200. In one embodiment, page 220 (a task/event page, or other page or object) is enabled to query a server 210 to determine if the page (e.g., task/event page or object) should refresh itself. Page 220 queries polling server 210 periodically (e.g., every 15 seconds, or every 2 to 3 minutes) to determine if the page should be refreshed. Responsive to a polling message 1 from page 220, polling server 210 authenticates the polling message and checks an update table 215 and sends a polling response 2 back to page 220 with information that enables page 220 to determine if page 220 should be refreshed. Such information might include timestamp information, or other information usable by page 220 to make the determination. Application server 200 provides update information to polling server 210 in the form of outbound messages 202, which might include user id, object information, timestamp information, authentication information and event type information as will be described in more detail below. Polling server 210 stores relevant information in outbound messages 202 to one or more tables 215. If a determination is made that page 220 should refresh, page 220 sends a refresh request 3 to application server 200, which sends a refresh response 4 with appropriate updated page information. Thus, using polling server 210, the page refreshes (requests updates from the application server 200) only when updates information for the page is available, thus reducing the load on the application server 200. The frequency of this request allows a "reasonable" delay in showing up-to-date data. The application server 200 provides information to the polling server 210 that enables the polling server to know when to respond to a polling message query that an update to a specific object has occurred. Given the amount of polling—users*polls per minute—direct use of an application server is generally undesirable as direct application server accesses include unavoidable database use, and use of the application server in this manner could quickly consume all available database connections.

Various aspects and embodiments, and features of the components of the polling system will now be described with reference to FIG. 3.

Polling Client

The task/event page includes a poller (polling client 225), that runs periodically (e.g., every 10 or 15 seconds or every minute—this time is tunable). The poller calls or queries the polling server 210 by sending a polling message or polling client request with a poll_type (e.g. "task_event_refresh"), and a session token. The polling server can return different responses, depending on certain factors, for example:

HTTP UNAUTHORIZED—the credentials supplied are invalid (or the service believes the poller to be abusive.) The poller should stop making requests.

HTTP OK—the polling row id is returned. The client must keep track of the last few ids returned and ignore ids that it has seen before. If the id is new, the polling client should cause the page to be refreshed.

HTTP NOT MODIFIED—no new polling data.

HTTP (something)—the service returns the maximum polling frequency—only returned once if the service believes the client is calling too often.

Polling Service/Server

The polling server 210 responds to polling requests. In certain aspects, the polling server is a stand-alone servlet, with minimal filters and little or no standard context.

Polling Service

Authentication

The first time a session token is seen the session is authenticated, e.g., through an api; a child session is created for polling and a long timeout—e.g., 8 hours is set and the user/organization is noted for the session. If authentication fails, HTTP UNAUTHORIZED is returned. (Or HTTP NOT MODIFIED—Polls from this child session will continue working until the session timeout—which will force a new authentication request.

Polling Service

Polling Client Requests

In one embodiment, each polling client request includes a session token (cookie), and poll_type. The service checks for org/user/poll_types in the in-memory polling data table 215. If data is found, and it is newer than the time of the previous polling request (minus some delta to allow for timing slop)—HTTP OK and the related polling id is returned, and the data is marked as consumed. Otherwise, HTTP NOT MODIFIED is returned.

If the current request is found to be too soon after the last request, the server 210 responds with HTTP (something) and the minimum frequency. This same response can be used for all requests if it is desired to (for whatever reason) slow down polling clients.

Polling Service

Feeding

In one embodiment, in application server 200, triggers against tasks/events will upsert a polling information into a table for the impacted user with poll_type="task_event_refresh" and create_date=current timestamp. In one embodiment, an insert or update into this table triggers a workflow rule, which will cause an outbound message 202 to be sent to a polling service endpoint, e.g., polling server 210.

The polling service exposes a simple webservice endpoint. This endpoint accepts organization/user/poll_type (e.g., outbound messages 202), and uses this information to keep an in-memory list of recent polls.

Polling Service

Load Balancing

In one embodiment, outbound messages sent to a polling server 210 will be propagated to other polling servers where more than one polling server is present in the system. A few load balancing approaches include:
- Use Apache JCS—http://jakarta.apache.org/jcs/—configured with:
  - Memory: LRU Memory Cache.
  - Lateral: TCP Lateral Cache—http://jakarta.apache.org/jcs/LateralTCPAuxCache.html—allows service/servers to be kept synchronized
- Use Jboss Cache 2.0—http://labs.jboss.com/file -access/default/members/jbosscache/freezone/docs/2.1.0.CR1/userguide_en/html_single/index.html#d0e138
- Each service/server can be configured as a cluster.

Polling Service

Initial State

When a server starts up and discovers that it does not have polling data it will query the polling table, through the api, for all rows.

Polling Service ("Pollmatic")

Pollmatic allows a page (e.g., a Visualforce page or other page) to send repeated queries for application server changes without incurring the overhead of a direct application server call. Pollmatic can be used, for example, to force an automatic refresh of a page that shows events when an event is changed on the application server.

In one embodiment, a Pollmatic Iframe 225 is integrated into a Visualforce page, or other page. The Pollmatic Iframe, in one embodiment, includes a robust Javascript polling mechanism that continually asks the polling service/server if something has changed on the application server. One skilled in the art will understand that other polling mechanisms may be used. In certain aspects, the Iframe requires a specific URL and parameters to work:

Server URL:://apps.salesforce.com/pollmatic/iframe.poll
Parameters:
sessionId={!$Api.Session_ID}
   The user's session
apiurl={!$Api.Partner_Server_URL_90}
   Server URL for partner API 9.0
pollingInterval=50000
   The interval between poll requests is in milliseconds. (TBD: The minimum polling interval is five minutes.)
notice=<yournoticetype>
   The notice used here must match the notice specified when configuring an org to use Pollmatic. If integrating Pollmatic into a page that shows calendar info, a notice could be notice=calrefresh.

The following is an example of an Iframe component:

```
<apex:iframe id="pollmatic"
src="http://apps.salesforce.com/pollmatic/iframe.poll?pollingInterval=
1000&sessionId={!$Api.Session_ID}¬ice=
calrefresh&apiurl={!$Api.Partner_Server_URL_90}"/>
```

When the Pollmatic Iframe gets new information via polling, the Iframe calls a Javascript method. This method could do a simple page refresh; re-render part of a page or do anything else that Javascript enables.

In certain aspects, the following Javascript example can be included in a page:

document.domain="salesforce.com"
   The Pollmatic service runs on a different server than the application server, and it must reset the documents domain to the less specific "salesforce.com" to allow the Pollmatic Iframe to call into the page.

function gotInfo(result) {<do something interesting>}
   The Pollmatic Iframe calls this function when the polling notice has been updated.

For example:

```
<apex:page controller="pollmaticTestPageController">
<apex:iframe id="poller" src="://apps.salesforce.com
/pollmatic/iframedebug.poll?pollingInterval=1000&sessionId=
{!$Api.Session_ID}&notice=calrefresh&api
url={!$Api.Partner_Server_URL_90}"/>
<script>
   document.domain="salesforce.com";
   var lastResult = 0;
   function gotInfo(result) {
      callActionFunction( );
   }
</script>
<apex:form id="output">
   <apex:actionFunction action="{!pinged}" rerender="output" name=
   "callActionFunction"/>
</apex:form>
</apex:page>
```

The request for the iframe.poll page is authenticated with the passed in sessionId, against a passed-in api url. In certain aspects, the session in Pollmatic can be in one of three states after authentication:

1. Authenticated—The session was successfully authenticated, and will not be checked again for a period of time, e.g., four hours. After that period of time, the session will be authenticated again. This means that if a session is authenticated in Pollmatic, and within those four hours, the application server session is made invalid (through logging out, for example). Pollmatic will continue to accept poll requests from the Pollmatic Iframe.

2. Unauthenticated—The session was not authenticated. The session will never be checked again.

3. Uncheckable—The session could not be checked due to various issues: a network issue, the API server is unavailable, organization rate limits have been exceeded, or other issues. This session is authenticated again within 15 to 30 minutes or other time period. The re-check time is random so that the API server does not get hit with multiple, simultaneous authentication requests when the API server becomes available again.

The Pollmatic Iframe makes polling requests to check.poll. These requests are authenticated in the same manner as iframe.poll.

Polling requests will not start for ten seconds after page load. If requests to check.poll are not answered in a timely manner (say, the Pollmatic service is down), polling requests are stopped for a period of time defined as two times your polling interval, and then restarted.

In one embodiment, the Pollmatic service gathers information about polling notices in two ways:
1. When a session is authenticated, the system will check to see if the organization has been seen by the service since the service was started. If not, all polling information from the application server for the organization within 30 seconds is gathered.
2. The Pollmatic service (e.g., server 210) accepts outbound messages 202 from the application server 200 describing polling information for a single user.

In certain aspects, pollmatic setup includes the following actions:
1. Create a custom object, Poll Notice.
2. Create an "always on" workflow rule against all Poll Notice changes.
3. Create an Outbound Message action, triggered by the workflow rule.
4. Create a trigger which updates Poll Notice.

In certain aspects, the Pollmatic service requires an object 215 (also called "Poll Notice table") that includes the following fields:
User—Lookup(User)—The user that should be alerted to changes.
Date—Date/time—The date/time that the change took place.
Notice—Text( )—The notice type.

In certain aspects, rows inserted into table 215 should ensure that there is only one row per User/Notice combination. That is, if a row is inserted for user A and notice "calrefresh," only that row for future user A and notice "calrefresh" date changes should be updated. This object is secured in certain aspects to allow any user API access to all rows. The first time an organization uses the polling service, the pollmatic service selects all rows from this organization's object.

The Pollmatic service/server 210 accepts outbound messages 202 from application server 200 that includes the user id, date, and notice. The service keeps track of these messages, and uses them to let the pollmatic Iframe know that a notice has arrived.

In certain aspects, the outbound message 202 includes one or more of:
Name: Poll Notice Modified
Object: Poll_notice_c
Fields: id, date_c, user_c, notice_c
Endpoint URL: http://apps.company name.com/pollmatic/ set.poll In certain aspects, some or all changes to the Poll Notice object can trigger workflow.
Object: Poll_notice_c
Rule Criteria: if(true, true, true)
Immediate Workflow Action: Outbound Message, Poll Notice Modified Triggers can be written to update the Poll Notice object. Below is an example of a trigger that will react to changes to an Event. Updates and inserts to the Poll Notice table preferably avoid duplicate notice values for a user.

```
trigger PollNotification on Event (after insert,after update,before delete) {
    Set<String> impactedUsers = new Set<String>( );
    if (trigger.isdelete){
        for (Event e : Trigger.old) {
            String u = e.OwnerId;
            if (u.substring(0,3)=='005') {
                impactedUsers.add(u);
            }
        }
    } else {
        for (Event e : Trigger.new) {
            String u = e.OwnerId;
            if (u.substring(0,3)=='005') {
                impactedUsers.add(u);
            }
        }
    }
    List<Poll__Notice__c> notices =
        [select user__c, notice__c, date__c from poll__notice__c
            where user__c in :impactedUsers
            and notice__c='calrefresh'];
    for(Poll__Notice__c notice : notices) {
        impactedUsers.remove(notice.user__c);
        notice.date__c = System.now( );
    }
    for(String user : impactedUsers) {
        notices.add(new Poll__Notice__c(user__c=user,
            notice__c='calrefresh', date__c=System.now( )));
    }
    upsert(notices);
}
```

In certain aspects, Pollmatic may be told about application server changes without the use of the Poll Notice object. This could minimize the executed DML statements during an Event or Task change, for example.

The endpoint url for direct workflow messages may be slightly different:
1. Uses wfset.poll (instead of set.poll).
2. The url should indicate which fields correspond to the date and user entries in the message.

Using an Event as an example:
Outbound Message Name—suggest Event Modified
Endpoint URL: http://apps.company name.com/pollmatic/ wfset.poll?userOwnerId¬ice=calrefresh&date= LastModifiedDate
User=OwnerId—this tells the Pollmatic service that the OwnerId parameter is to be used to identify the affected user.
Date=LastModifiedDate—this tells the Pollmatic service that LastModifiedDate should be used to identify the time of the change.
Notice=calrefresh—this notice is the same as the notice you specified in the iframe url.
Include 3 fields:
Id
OwnerId
LastModifiedDate Again, using Event, as an example, a workflow rule can be set up:
Object: Task or Event
Rule Criteria: if(true, true, true)
Immediate Workflow Action: Outbound Message and either the Task Modified or Event Modified rule as appropriate.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of controlling a number of object update requests sent from a client system to an application server, the method comprising the steps of:
   receiving a request in a polling server from a client system, the request including data identifying a first user and an object provided to the client system by an application server;
   determining in the polling server whether an update message related to the object has been received by the polling server from the application server; and if so
   sending a response from the polling server to the client system, the response including information usable by the client system to determine if new or updated information related to the object is available on the application server; and
   receiving at the application server an update request from the client system responsive to the client system processing the response to determine that new or updated information related to the object is available on the application server.

2. The method of claim 1, wherein the request further includes authentication information associated with the object, and wherein the method further includes determining whether the request is authentic based on the authentication information before sending the response.

3. The method of claim 2, further including sending an authentication request, including the authentication information, from the polling server to the application server, and receiving an authentication response from the application server, the authentication response identifying whether the authentication information is authenticated.

4. The method of claim 3, further including storing to cache in the polling server whether the authentication information is authenticated.

5. The method of claim 2, wherein determining whether the request is authentic includes authenticating the request based on information stored in cache on the polling server.

6. The method of claim 1, wherein the object is a web page provided by the application server.

7. The method of claim 1, wherein the response sent to the client system includes timestamp information for the object.

8. The method of claim 1, wherein the client system is communicably coupled with the application server and the polling server over the internet.

9. The method of claim 1, wherein the application server is communicably coupled with the polling server over the internet or a direct network connection.

10. The method of claim 1, wherein determining includes accessing an update table stored on the polling server, the update table including objects and related update information received from the application server in update messages.

11. A database system configured to control a number of object update requests sent from client systems to an application server, the system comprising:
    an application server communicably coupled with a database that stores data objects, the application server being configured to provide data objects to client systems and to update data objects responsive to requests from client systems; and
    a polling server communicably coupled with the application server, the polling server configured to receive polling requests from client systems and to receive update messages from the application server; and
    a client system executing code that causes the client system to periodically send polling requests to the polling server,
    wherein upon updating an object, the application server sends an update message to the polling server identifying the object updated;
    wherein upon receiving a request from the client system identifying a specific object, the polling server sends a response to the client system including an indication of whether the specific object has been updated, and
    wherein upon receipt of the response, the client system sends an update request message to the application server requesting updated data for the specific object.

12. The system of claim 11, wherein the request from the client includes information identifying a user and information identifying an object.

13. The system of claim 12, wherein the request from the client further includes session identification information, wherein the polling server upon receipt of the request authenticates whether the request is valid based on the session id information.

14. The system of claim 13, wherein the polling server authenticates the request by sending an authentication message to the application server.

15. The system of claim 13, wherein the polling server authenticates the request by checking a cache that stores authentication information by session id.

16. The system of claim 11, wherein an update message includes timestamp information, and wherein the response sent to the client system by the polling server includes the timestamp information for the specific object, wherein upon receipt of the request, the client system determines whether the specific object has been updated based on the timestamp information.

17. The system of claim 11, wherein the application server responds to the update request with updated data for the specific object.

18. The system of claim 11, wherein the code executing on the client system is part of the specific object provided to the client system by the application server.

19. The system of claim 11, wherein the code executing on the client system is received with the specific object provided to the client system by the application server.

20. A tangible and non-transitory computer readable medium that stores code for controlling one or more processors to enable controlling a number of object update requests sent from a client system to an application server, the code including instructions to:
    receive a request in a polling server from a client system, the request including data identifying a first user and an object provided to the client system by an application server;
    determine in the polling server whether an update message related to the object has been received by the polling server from the application server; and if so
    send a response from the polling server to the client system, the response including information usable by the client system to determine if new or updated information related to the object is available on the application; and
    receive at the application server an update request from the client system responsive to the client system processing the response to determine that new or updated information related to the object is available on the application server.

* * * * *